June 23, 1931.   D. H. GILSON   1,811,232
MULTIPLE TRASHER
Filed Oct. 17, 1930
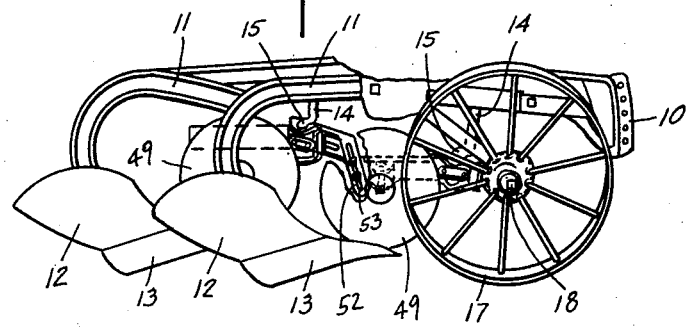
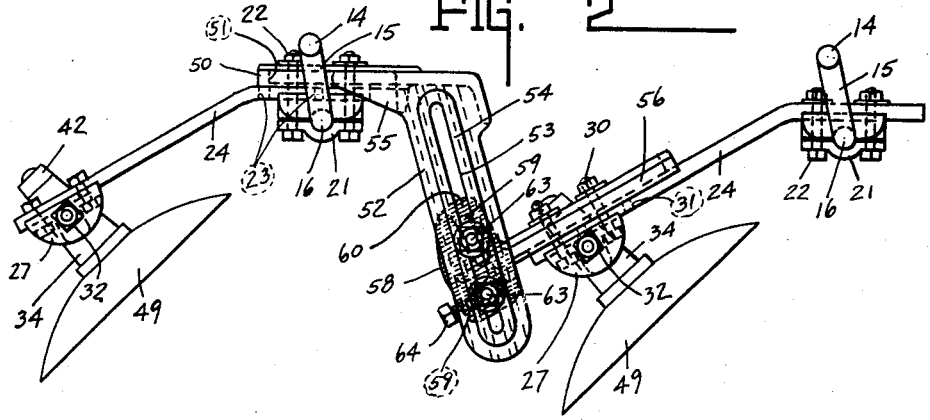
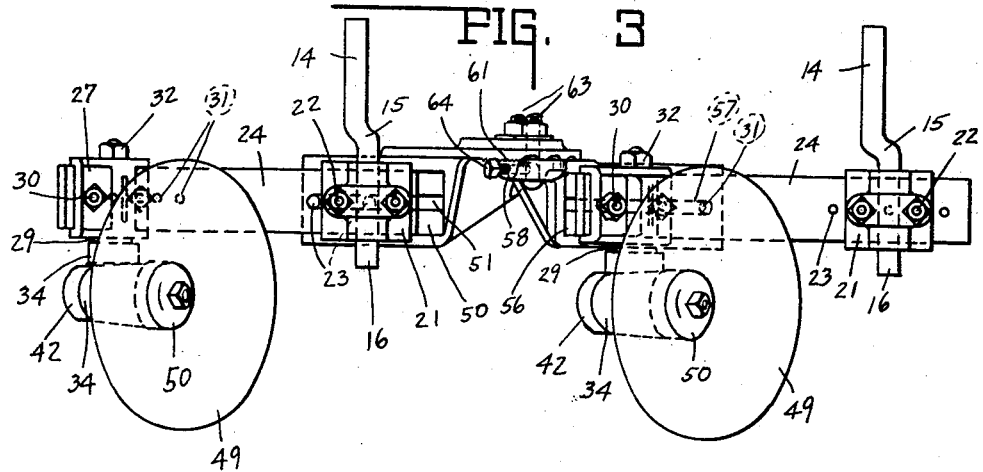
INVENTOR.
DAYTON H. GILSON
BY
Lockwood Lockwood Goldsmith + Galt
ATTORNEYS.

Patented June 23, 1931

1,811,232

UNITED STATES PATENT OFFICE

DAYTON H. GILSON, OF RUSHVILLE, INDIANA

MULTIPLE TRASHER

Application filed October 17, 1930. Serial No. 489,357.

This invention relates to plows particularly those of the tractor drawn type.

The chief object of the invention is to simplify the present tractor drawn plow provided with a jointer, by providing a trasher which is so arranged that it is universally adjustable, is self cleaning and it will prepare the ground ahead of the plow, thereby functioning as a jointer.

This invention is an improvement upon the broad disclosure of a similar invention for which there was granted Patent No. 1,732,885 dated October 22, 1929.

The chief feature of the invention consists in the connection between the jointer trashing disc, whereby side draft is substantially eliminated.

Another feature of the invention consists in the arrangement whereby each jointer disc may be adjusted and irrespective of the others, and suitably connected together for the elimination of side draft.

Another feature of the invention consists in the formation of the several parts, such that the parts may be readily duplicated and applied to a plow having two or more shares and trashing discs positioned as jointers.

The full nature of the invention will be understood from the accompanying drawings and the following description and claims:—

In the drawings Fig.1 is a perspective view of a tractor showing the invention applied thereto and part of the foremost jointer and trasher being broken away to show another portion of the invention in greater detail.

Fig. 2 is a top plan view of a pair of trashing discs and the support therefor.

Fig. 3 is a rear elevation of the same.

In the drawings 10 indicates the hitch whereby the tractor drawn plow is connected to the tractor and associated therewith are the plow beams 11, each supporting the mold board 12 and a plow share 13. Depending from each of the plow beams in the customary manner, is a jointer stem 14 having the angular offset 15 and the lower extension 16. The entire construction is supported by the wheel 17 carried by the axle 18. The foregoing is a standard tractor plow and to the same is applied an attachment for the purpose set forth in the before mentioned Letters Patent.

The attachment consists of a bar 24 which at one end includes a plurality of spaced openings 23. The clamping plate 21 is associated with the depending portion 16 of the jointer stem and the bolts 22 adjustably and clampingly secure the bar 24 to the jointer stem.

The jointer trashing disc 49 is swivably mounted in the bearing 34 and is rotatably mounted therein by means of the members 50 and 42. The bracket 27 adjustably supports the spindle 29 so that the disc may be provided with the desired angular adjustment. The nut 32 secures the spindle 29 in the desired angular adjustment. The bracket 27 through the bolts 30 is clampingly adjusted upon the end of the bar 24 and through the spaced openings 31. Each plow is provided with a trashing disc supported by a bar 24 in turn supported by the jointer stem, the bar and jointer stem being adjustable to the disc pivot support and the bar connection being adjustable as well as an adjustable connection between the pivot forming member and the support for the disc.

In all of the foregoing respects, the aforesaid disclosure is substantially identical with that of the before mentioned patent, except that each disc support includes an individual supporting bar 24. The several discs are connected together to prevent side draft and by a brace construction which is adjustable, so that any desired adjustment may be obtained for each of the discs and then the bracing construction may be adjusted to said position for maintaining said position. Furthermore, the brace construction is so arranged that it is simultaneously associated with the supporting bars of both discs, one end being associated with the bar and jointer connection and the other end being associated with the pivotal support and bar connection.

The brace construction includes an L-shaped member having one arm 50 provided with the elongated slot 51 therein and another arm 52 extends angularly of the first mentioned arm and lies in a plane substantially transverse to the plane of the portion 50 and includes an elongated slot 53. The slot 53 is defined by a peripheral wall 54. The portion 50 includes the lateral flanges 55, forming a channel which embraces the bar 24. The bolts 22 serve to secure one end of the L-shaped member to the bar and jointer stem connection.

The other member is substantially T-shaped and includes a channel like arm 56 having an elongated slot 57 therein by which the arm 56 embraces the bar 24 and is mounted thereon by the bolts 30 of the bar and disc pivot support connection. The other arm 58 of the member 56 lies in a plane substantially transverse to the plane of the channel 56 and includes a pair of substantially transverse slots 59. The upper surface 60 of the portion 58 is serrated and the lower surface 61 of the arm portion 52 is similarly but transversely fashioned and a pair of clamping bolts 63 clamping secure the two adjacent ends of the two angular channel forming members together in the adjusted and bracing position. To prevent slippage, a stop type set screw 64 is likewise provided.

The invention claimed is:—

1. In a multiple share plow, the combination of a plurality of spaced plow shares, a similar number of jointer stems ahead of the same, a trashing disc positionable ahead of each share, a bar connecting each disc to its stem, and an independent bracing connection interposed between each pair of adjacent discs for uniting the disc supports.

2. A device as defined by claim 1, characterized by each bar and jointer mounting including an adjustable connection.

3. A device as defined by claim 1, characterized by each bar and disc connection being adjustable.

4. A device as defined by claim 1, characterized by each bar having an adjustable connection at one end with its supporting jointer stem and an adjustable connection at its other end with the disc mounting.

5. In a multiple share plow, the combination of a plurality of spaced plow shares, a similar number of jointer stems ahead of the same, a trashing disc positionable ahead of the same, a bar supported by the jointer stem, a disc support supported by the bar, and a bracing construction between each pair of discs, detachably mounted at one end to the stem and bar connection, and similarly mounted at the opposite end to the disc support and bar connection of the adjacent disc.

6. In a multiple share plow, the combination of a plurality of spaced plow shares, a similar number of jointer stems ahead of the same, a trashing disc positionable ahead of the same, a bar supported by the jointer stem, a disc support supported by the bar, and a bracing construction between each pair of discs, detachably mounted at one end to the stem and bar connection, and similarly mounted at the opposite end to the disc support and bar connection of the adjacent disc, said bracing construction including a plurality of members arranged for rigid but adjustable intermediate connection.

7. A device as defined by claim 6, characterized by each bar and jointer mounting including an adjustable connection.

8. A device as defined by claim 6, characterized by each bar and disc connection being adjustable.

9. A device as defined by claim 6, characterized by each bar having an adjustable connection at one end with its supporting jointer stem and an adjustable connection at its other end with the disc mounting.

10. A bracing construction for connection to adjacent jointer trashing discs including an L-shaped member, the arms of which lie in substantially transverse planes and each having an elongated slot therein, another member having two arms substantially transverse to each other and which lie in substantially transverse planes, and a bolt and slot connection between the two adjacent arms of said members for rigidly connecting the members together in adjusted position, the remote portions of each member being arranged for brace mounting and including lateral side extensions forming channels.

11. A bracing construction for connection to adjacent jointer trashing discs including an L-shaped member, the arms of which lie in substantially transverse planes, another member having two arms substantially transverse to each other and which lie in substantially transverse planes, and a bolt and slot connection between the two adjacent arms of said members for rigidly connecting the members together in adjusted position, the remote portion of each member being arranged for brace mounting.

In witness whereof, I have hereunto affixed my signature.

DAYTON H. GILSON.